United States Patent [19]

Sunder-Plassmann

[11] 4,365,056

[45] Dec. 21, 1982

[54] PROCESS FOR PRODUCING 2-($C_1$ TO $C_3$ ALKYL)-$\Delta^2$-OXAZOLINE COPOLYMERS

[75] Inventor: Paul Sunder-Plassmann, Marl, Fed. Rep. of Germany

[73] Assignee: Chemische Werke Hüls AG, Marl, Fed. Rep. of Germany

[21] Appl. No.: 301,269

[22] Filed: Sep. 11, 1981

[30] Foreign Application Priority Data

Sep. 25, 1980 [DE] Fed. Rep. of Germany ....... 3036119

[51] Int. Cl.$^3$ ............................................ C08G 73/00
[52] U.S. Cl. .................................. 528/403; 528/408; 548/239
[58] Field of Search ................. 528/403, 408; 548/239

[56] References Cited

U.S. PATENT DOCUMENTS 3,326,929  6/1967  Seeligen ............................. 528/423

FOREIGN PATENT DOCUMENTS 1263300  3/1969  Fed. Rep. of Germany .

OTHER PUBLICATIONS

Chem. Review 71, 1971, 496.
J. Macromol. Schi. A9, (1975), 703 ff.
Angew Chem. 78, (1966), 920.

Primary Examiner—Maurice J. Welsh
Attorney, Agent, or Firm—Millen & White

[57] ABSTRACT

A process for producing linear or slightly branched 2-($C_1$ to $C_3$-alkyl)-$\Delta^2$-oxazoline copolymers from more than 50 mole % of 2-(isopropyl- and/or n-propyl)-$\Delta^2$-oxazoline and less than 50 mole % of 2-(methyl- and/or ethyl)-$\Delta^2$-oxazoline, the copolymers having a viscosity number in the range of 35 to 70 ml/g which is easily reproducible from batch to batch, comprises polymerizing the corresponding monomers in the presence of a cation-active catalyst having an anion of slightly nucleophilic nature, wherein, 1. the monomers contain less than 200 mg of water per liter of monomer and less than 0.003% by weight of basic nitrogen, the monomers being obtained by specified purification operations:

2.1 the polymerization is discontinuous and is carried out in a stirring vessel having a reflux condenser adequately dimensioned to remove the heat of polymerization by evaporative cooling, 2.2 optionally, the polymerization is conducted in the presence of 10 to 50% by volume, referred to the volume of the mixture of monomers, of an inert organic solvent, 2.3 the polymerization is conducted in the temperature range of 120° to 175° C., and the temperature following the conversion of 90 mole % of the monomers does not exceed 165° C., and 2.4 the polymerization is stopped in the conventional manner after 96 to 99.5 mole % of the monomers has been polymerized.

9 Claims, No Drawings

PROCESS FOR PRODUCING 2-($C_1$ TO $C_3$ ALKYL)-$\Delta^2$-OXAZOLINE COPOLYMERS

BACKGROUND OF THE INVENTION

The present invention relates to a process for preparing copolymers of certain oxazolines.

It has long been known to produce 2-($C_1$ to $C_3$ alkyl)-$\Delta^2$-oxazoline copolymers such as those which are prepared by the process of this application (hereinafter called polyoxazolines) (Chem. Reviews 71 [1971] 496).

In order to use these polyoxazolines on an industrial scale they must be manufacturable with reproducible properties. The viscosity number is one such important property for many applications. The viscosity number, also called the J value, is defined herein under the following test conditions: 25° C.; 0.5% of the polyoxazoline (weight/vol of solution) in a mixture of isopropanol/water (50%-volume of isopropanol).

Polyoxazolines with J values in the range from 35 to 70 ml/g have been obtained, for instance, in the absence of solvents by heating for 15 hours at 170° C. in the final phase of a polymerization (German Patent 12 63 300). The products are characterized by a more or less pronounced degree of branching (J. Macromol. Sci. A9 [1975] 703 ff). Accordingly, they are not optimally suited for many applications, in particular the use not yet part of the state of the art which is disclosed in German patent applications P 30 36 127.4-44 and P 30 36 101.4, corresponding to U.S. application Ser. No. 301,270, filed Sept. 11, 1981, whose disclosures are incorporated by reference herein.

Similar products have been obtained by polymerizing at temperatures approximately up to 200° C. for polymerization times that were substantially shortened.

Again, polyoxazolines within the stated viscosity range have been obtained by inducing a planned branching or partial crosslinking by addition of a slight amount of an alkylene- or arylene-bis-oxazoline as a comonomer to the polymerization input material (Angew. Chem. 78 [1966] 920, right-hand column 5th paragraph). These products are not optimally suited for many applications, in particular for the above cited use not yet in the state of the art.

Another drawback of the state of the art of preparing these copolymers, especially as regards the above cited use not yet in the state of the art, is that attainment of reproducible J values from batch to batch is difficult.

It is known that polyoxazolines can be produced in the presence of inert, organic solvents. Polyoxazolines so prepared however do not simultaneously meet the criteria of "linearity" and "viscosity number" as required for the polymers prepared by this invention.

It is, moreover, known that cation-active catalysts whose anions are strongly nucleophilic act in a chain-breaking manner. Accordingly, as a rule, those catalysts are used whose anions possess only a slightly nucleophilic character. It is further known that nucleophilic impurities in the polymerization batch, for instance water, amines and alcohols, act in a chain-breaking manner. Thus, the production of high J value polyoxazolines is made difficult or even impossible. The purification of the monomers, therefore, is considered necessary. Monomers have been treated with acid chlorides or acid anhydrides and have been fractionally distilled (U.S. Pat. No. 3,326,929).

The drawbacks consequently incurred include more than insignificant losses in monomer. Moreover, the monomers so purified were not free from newly entrained, chain-breaking impurities.

It has already been proposed to treat the monomers with diisocyanates and then to fractionally distill them. (Angew. Chem. 78 [1966], 920, right-hand column, 2nd paragraph). This purification procedure, however, has not been generally successful with the 2-($C_1$ to $C_3$ alkyl)-$\Delta^2$-oxazolines because these are not inert with respect to such isocyanates, except for 2-isopropyl-$\Delta^2$-oxazoline. When producing the polyoxazolines on an industrial scale, as a rule, a fractional distillation in the absence of entraining agents is the accepted procedure for purifying the monomers (Angew. Chem. 78 [1966], 920, right-hand column, 2nd paragraph). However, the above-described drawbacks essentially still remain.

SUMMARY OF THE INVENTION

Accordingly, it is an object of the present invention to provide a process for producing linear or only slightly branched polyoxazolines with a J value in the range of 35 to 70 ml/g easily reproducible from batch to batch.

Upon further study of the specification and appended claims, further objects and advantages of this invention will become apparent to those skilled in the art.

These objects have been attained by providing a process for producing linear or slightly branched 2-($C_1$ to $C_3$-alkyl)-$\Delta^2$-oxazoline copolymers from more than 50 mole % of 2-(isopropyl- and/or n-propyl)-$\Delta^2$-oxazoline and less than 50 mole % of 2-(methyl- and/or ethyl)-$\Delta^2$-oxazoline, the copolymers having a viscosity number in the range of 35 to 70 ml/g which is easily reproducible from batch to batch, comprising polymerizing the corresponding monomers in the presence of a cation-active catalyst having an anion of slightly nucleophilic nature, wherein, 1. the monomers contain less than 200 mg of water per liter of monomer and less than 0.003% by weight of basic nitrogen, the monomers being obtained by the following purification operations:

1.1.1 fractional distillation, optionally under reduced pressure and optionally after a preaddition of an inert, organic solvent acting as an entraining agent for impurities, and having a boiling point at least 15° C. lower at normal pressure than the monomer, which method can be applied to all monomers, or 1.1.2 addition of an inert, organic solvent acting as an entraining agent for impurities and having a boiling point at least 15° C. lower at normal pressure than the monomer, and then extensive separation of this solvent by distillation, followed by addition to the sump product of from 0.01 to 2 parts by weight, referred to 100 parts by volume of the monomer, of an aromatic isocyanate boiling at above 100° C./7 mbar (e.g. g of isocyanate/100 ml of monomer), and ensuing fractional distillation at reduced pressure, which method can only be applied to 2-isopropyl-$\Delta^2$-oxazoline monomer;

1.2 ensuing treatment with silica gel or neutral aluminum oxide, and 1.3 optional drying above a molecular sieve of a pore width of 0.3–0.4 nm;

2.1 the polymerization is discontinuous and is carried out in a stirring vessel having a reflux condenser adequately dimensioned to remove the heat of polymerization by evaporative cooling, 2.2 optionally, the polymerization is conducted in the presence of 10 to 50% by volume, referred to the volume of the mixture of monomers, of an inert organic solvent, 2.3 the polymerization is conducted in the temperature range of 120° to 175° C., and the temperature following the conversion of 90 mole % of the monomers does not exceed 165° C., and 2.4 the polymerization is stopped in the conventional manner after 96 to 99.5 mole % of the monomers has been polymerized.

DETAILED DISCUSSION

Those monomers are used in a preferred embodiment of the process of this invention which contain less than 100 mg of water per liter and less than 0.0015, especially less than 0.001% by weight of basic nitrogen. The term "basic nitrogen" denotes titratable nitrogen present in contaminants such as amines or ammonia.

Obviously, the solvents used in the polymerization must meet the same rigorous purity requirements as given for the monomers.

The fractional distillations required for this invention are all fully conventional and are carried out using fully routine procedures. By reduced pressure herein generally is meant a pressure less than 1000 mbar, e.g., 100–500 mbar.

The molecular sieve drying is also a fully conventional procedure and can be carried out using molecular sieves such as Bayer-Zeolith T 144, pore width 0.4 nm, of Bayer AG, or any equivalent.

Examples of suitable inert organic solvents acting as entraining agents include benzene, toluene and chlorobenzene. Normally, when used, the amount of such a solvent is 3–15 volume %, based on the volume of the monomer treated.

When a 2-isopropyl-$\Delta^2$-oxazoline monomer is used, preferably, it shall be used after being purified according to steps 1.1.2 through 1.3 above. An example of a suitable aromatic isocyanate for treatment of the 2-isopropyl-$\Delta^2$-oxazoline monomer is diphenylmethane-4,4'-diisocyanate (MDI). Other examples of suitable but less preferred aromatic isocyanates are the isomeric tolylenediisocyanates and their mixtures.

The extensive separation of the first added inert organic solvent refers to a removal of about 80–95 weight % of this solvent by distillation.

The treatment of the monomers with silica gel or neutral aluminum oxide in step 1.2 is per se fully conventional. It includes, for instance, stirring the monomer together with a sufficient or excess amount of the adsorbent, e.g., 5–20 weight parts thereof per 100 weight parts of monomer, followed by a conventional separation by decanting and filtration, or, especially advantageously, conventional passage through an adsorbtion column.

The agitation reactor is provided with an effective stirring means, for instance, a helical stirrer as are conventionally used for mixing viscous reaction mixtures.

The polymerization is preferably conducted in the presence of 10–50 vol %, referred to the volume of the monomer mixture, of an inert organic solvent. Suitable inert organic solvents in the presence of which the polymerization can be carried out, for instance, include toluene, ethylbenzene, ortho-, meta- or para-xylene, chlorobenzene, dimethylformamide, dimethylacetamide, N-methylpyrrolidone, etc., and mixtures thereof.

Unless noted otherwise herein, all details of the process of this invention and the meaning of all terms used herein are fully conventional.

Suitable cation-active catalysts having an anion of slightly nucleophilic effect for instance include 70 to 80% by weight aqueous perchloric acid, diethyl sulfate, the sulfonic acids of benzene, para-toluene, trifluoromethane and perfluorobutane and their alkylesters, and the catalysts obtained in conventional manner by adduct formation between them and 2-aryl- and 2-alkyl-$\Delta^2$-oxazolines and their mixtures, as well as other known equivalents.

The amount of catalyst depends on the desired J value of the polymer to be prepared and can easily be ascertained by routine preliminary trials. As a rule, it is 0.025 to 0.1 mole % referred to the molar amount of the monomer mixture. Generally, the catalyst is added to the reaction mixture at room temperature as a solution in an inert organic solvent selected from the above mentioned solvents in the presence of which the polymerization can be carried out. When preparing the catalytic solutions of the sulfonic acids of trifluoromethane and perfluorobutane, toluene, ethylbenzene and the isomeric xylenes should be avoided as solvents since they are not inert with respect to these catalysts.

As a rule, the following procedure is used. After the polymerization sets in at about 120° C., the polymerization temperature is allowed to rise to the desired value at a suitably selected total pressure, whereunder the desired monomer conversion is obtained within 2 hours. Then, the polymerization is stopped in the usual manner after a monomer conversion is achieved in the range of 96 to 99.5 mole %, preferably 98 to 99.5 mole %.

Preferably, the amount of 2-(isopropyl- and/or n-propyl)-$\Delta^2$-oxazoline is 65 to 93 mole %, and the amount of 2-(methyl- and/or ethyl)-$\Delta^2$-oxazoline is 35 to 7 mole % in the copolymers of this invention. The reproducibility referred to herein generally is the ability of the process to consistently achieve from batch to batch the same predetermined viscosity number with a variation of less than ±5%.

The copolymers prepared in accordance with the present invention have many applications. (See, e.g., Chem. Reviews 71 [1971], 500, left-hand column which is incorporated by reference herein). They are especially suited, as mentioned, for the use, not yet in the state of the art, of the German patent applications P 30 36 127.4-44 and P 30 36 101.4. (U.S. application Ser. No. 301,270, filed Sept. 11, 1981.)

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The basic nitrogen in the monomers and possibly also in the solvents used in the polymerization is determined by conventional potentiographic titration at room temperature with 0.1 N HClO$_4$ in glacial acetic acid. The water content in the monomers and in the solvents used in the polymerization is determined by the conventional Karl Fischer method in an Aquacounter (the test value is taken 2 minutes after injecting the sample).

PURIFICATION OF THE MONOMERS AND SOLVENTS

To 1,500 ml of isopropyloxazoline obtained from the gas phase dehydration of N-(2-hydroxy-ethyl)-isobutyric acid amide (0.15% by weight of basic nitrogen; 230 mg of water per liter) 100 ml of toluene are added. A first running of 100 ml is distilled off at normal pressure. Following cooling to about 80° C., 10 g of MDI is added. Fractional distillation is performed at 130 mbars, the product distilling off at 80° C. (<0.001% by weight of basic nitrogen; 98 mg of water per liter).

The product is fed into a column of a commercial neutral aluminum oxide of activity I suited for column chromatography and thereafter is stored above a molecular sieve with a pore width of 0.4 nm. After a two-day stationary drying period, the water content is less than 50 mg of water per liter. The content in basic nitrogen is less than 0.001% by weight.

A mixture of methyloxazoline, which is obtained by reacting ethanolamine with acetonitrile (H. Witte, W. Seeliger, Liebigs Ann. Chem. [1974] 996, which is incorporated by reference herein; 0.0013% by weight of basic nitrogen; 880 mg of water per liter), and benzene is submitted to fractional distillation at normal pressure. Further operations, the same as those described above, produce a product with less than 0.001% by weight of basic nitrogen and less than 50 mg of water per liter.

A mixture of ethyloxazoline, obtained by reacting ethanolamine with propionitrile (loc., cit.: 0.022% by weight of basic nitrogen; >1,000 mg of water per liter), and benzene is submitted to distillation. After removing a first running at normal pressure, the product is fractionally distilled under reduced pressure.

Further operations as described above produce a product of similarly high purity. A mixture of N-methylpyrrolidone (NMP, 0.001% by weight of basic nitrogen, about 1.5% by weight of water) and toluene is submitted to distillation. Following removal of a first running at normal pressure, it is distilled at 133° C. and 123 mbars. Further operations as described above provide a product of similarly high purity.

Chlorobenzene is treated in the same manner as the isopropyloxazoline. A product of similarly high purity is obtained.

EXAMPLE 1 (Table 1)

500 ml of isopropyloxazoline,
100 ml of methyloxazoline,
175 ml of chlorobenzene,
25 ml of NMP and, while stirring,
27 ml of a 0.1 molar solution of perfluorobutane sulfonic acid (PFBS) in NMP ($\simeq$ a total of 38% by volume of solvent referred to the monomer mixture) are given into a dry 2-liter apparatus equipped with jacket heating. It is hooked up to a thermostat, a wide-neck intensive reflux condenser, a helical stirrer (ratio of helix width to inside reactor radius=0.3), a temperature sensor at the lower end of the stirrer shaft, a temperature recorder and a pressure regulator. An atmosphere of dry nitrogen is provided and the system is at room temperature.

Polymerization takes place under the conditions listed in Table 1. After the polymerization is completed, 700 ml of dry isopropanol is added at normal pressure and the viscous solution so obtained is forced at 85° C. into an apparatus holding 3 l of hexane. After adding 1 l of hexane, the precipitated product is allowed to settle. The upper solvent phase is separated. The product is then dissolved twice, each time in 500 ml of methylene chloride and precipitated by adding 2 l of hexane each time. The separated product is dried at 60° C. and 2 mbar.

Yield: 460 g$\simeq$80% of theoretical

The products of examples 2 through 6 are obtained similarly to the product of example 1 while observing the conditions listed in Table 1.

Examples 3 and 4, whose products are obtained under practically identical conditions, demonstrate the good reproducibility of the J value.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

TABLE 1

| Example | R in $\begin{array}{c}\text{N}\\ \text{O}\end{array}$ R | catalyst | time (min) | TEMPERATURE [jacket temperature in brackets] begin. | max. | end | J value (ml/g) | 200 ml of solvent[1]/600 ml of monomer; 0.05 mole-% of catalyst referred to monomer; 1.5 bar total pressure; heating jacket temperature: 150° C.; unless indicated otherwise |
|---|---|---|---|---|---|---|---|---|
| 1 | isopropyl + 22 mole-% of methyl | PFBS[3] | 75 | 120 | 160[5] | 154 | 61 | 175 ml of chlorobenzene, 25 ml of NMP |
| 2 | isopropyl + 10 mole-% of ethyl- | PTSM[2] | 150 | 128 [135] | 140 [140] | 140 [140] | 40 | 1 bar total pressure; para-xylene |
| 3 | isopropyl + 22 mole-% of methyl | PTSM | 85 | 120 | 152 | 150 | 52[4] | para-xylene; below, each time with 27 ml of catalyst solution |
| 4 | isopropyl + 22 mole-% of methyl | PTSM | 80 | 120 | 155 | 150 | 52[4] | para-xylene; |
| 5 | isopropyl + 22 mole-% of methyl | PTSM | 90 | 120 | 162 | 154 | 61 | 150 ml of para-xylene, 50 ml of NMP |
| 6 | isopropyl + 22 mole % of methyl | PFBS[3] | 75 | 120 | 159 | 153 | 56 | 175 ml of para-xylene, 25 ml of NMP |

[1]catalyst solution not contained therein
[2]para-toluene sulfonic acid methylester, 0.1 molar in para-xylene
[3]0.1 molar in NMP
[4]the monomers used for polymerization are from different purification batches
[5]after 40 minutes

What is claimed is:

1. In a process for preparing a linear or slightly branched 2-($C_1$ to $C_3$ alkyl)-$\Delta^2$-oxazoline copolymer from a mixture of monomers more than 50 mole % of which is 2-(isopropyl- and/or n-propyl)-$\Delta^2$-oxazoline and less than 50 mole % of which is 2-(methyl- and/or ethyl)-$\Delta^2$-oxazoline, the copolymer having a viscosity number of 35 to 70 ml/g which is easily reproducible from batch to batch, comprising polymerizing the monomers in the presence of a cation-active catalyst whose anion is slightly nucleophilic, the improvement wherein, (A) the monomers used as reagents contain less than 200 mg of water per liter of reagent and less than 0.003% by weight of basic nitrogen, the monomers being obtained by the following purification steps:

(i) fractional distillation thereof, optionally carried out after preaddition to the monomer reagent of an inert, organic solvent which acts as an entraining agent for impurities and which has a boiling point at least 15° C. lower at normal pressure than the monomer reagent, and optionally carried out at reduced pressure, which method can be applied to all monomers, or addition thereto of an inert, organic solvent which acts as an entraining agent for impurities and which has a boiling point at least 15° C. lower at normal pressure than the monomer reagent; followed by distillation to extensively remove this solvent; subsequently followed by addition to the resultant sump product of from 0.01 to 2 parts by weight, referred to 100 parts by volume of the monomer reagent, of an aromatic isocyanate boiling at above 100° C./7 mbar; and ensuing fractional distillation at reduced pressure, which method can only be applied to 2-isopropyl-$\Delta^2$-oxazoline monomer reagent;

(ii) subsequent contact with silica gel or neutral aluminum oxide, and (iii) optional drying above a molecular sieve having a pore width of 0.3 to 0.4 nm;

(B) the polymerization is discontinuous and is carried out in a stirring vessel provided with a reflux condenser adequately dimensioned to remove the heat of polymerization by evaporative cooling;

(C) the polymerization temperature is from 120 to 175° C., and the temperature following the conversion of 90 mole-% of the monomers does not exceed 165° C., and (D) the polymerization is stopped after a conversion of 96 to 99.5 mole-% of monomers has been reached.

2. A process of claim 1, wherein the monomers purified by steps (A)(i)-(iv) contain less than 100 mg of water/liter of reagent and less than 0.0015% by weight of basic nitrogen.

3. A process of claim 2, wherein the monomers contain less than 0.001% by weight of basic nitrogen.

4. A process of claim 1, wherein the polymerization is carried out in the presence of 10-50% by volume of an inert organic solvent.

5. A process of claim 1, wherein the inert organic solvent which is an entraining agent is benzene, toluene or chlorobenzene.

6. A process of claim 1, wherein the isocyanate is diphenylmethane-4,4'-diisocyanate.

7. A process of claim 4, wherein the inert organic solvent for the polymerization is toluene, ethylbenzene, ortho-, meta- or para-xylene, chlorobenzene, dimethylformamide, dimethylacetamide, N-methylpyrrolidone or a mixture thereof.

8. A process of claim 1, wherein the polymerization temperature is selected such that the degree of conversion at which the polymerization is stopped is achieved within 2 hours.

9. A process of claim 1, wherein the degree of conversion at which the polymerization is stopped is 98-99.5 mole %.

* * * * *